June 12, 1923.
F. C. CHAPMAN
1,458,393
REVOLVING CARRIAGE FOR DRIERS
Filed July 18, 1921
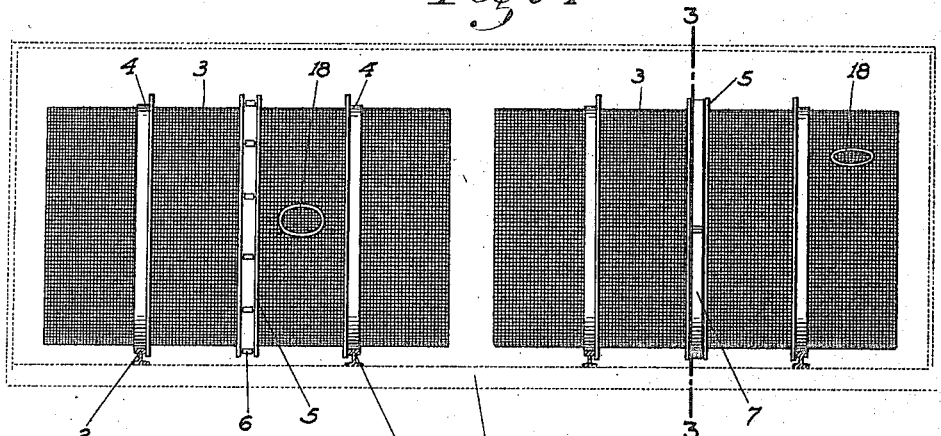
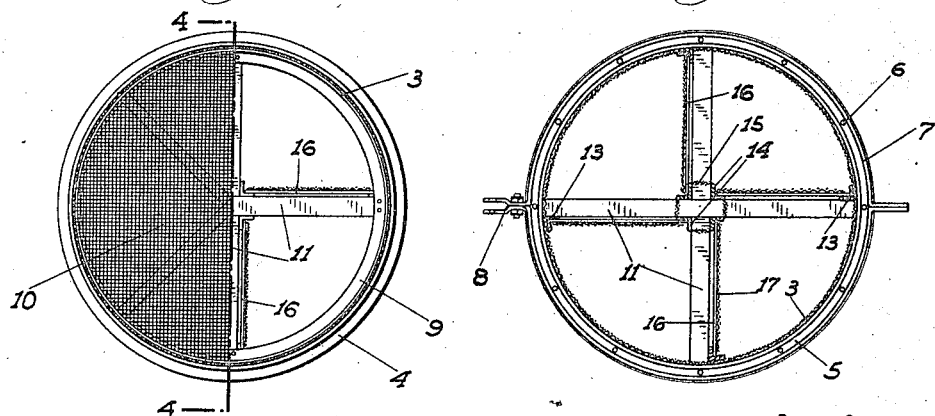
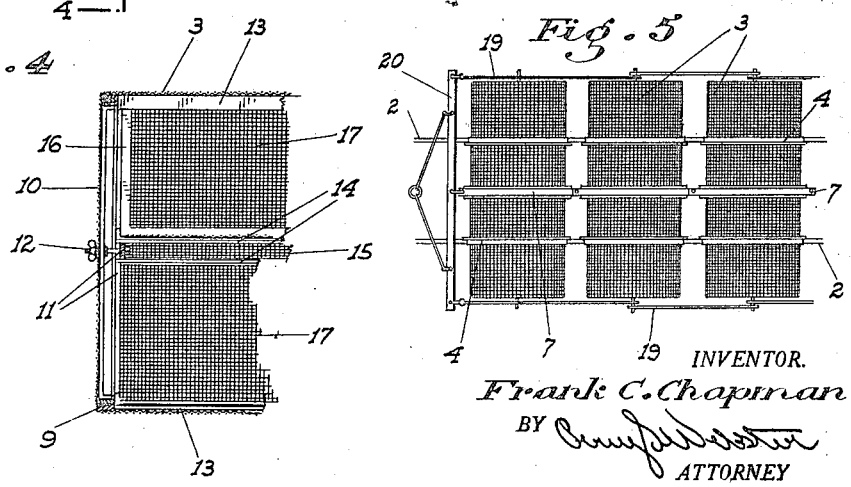
INVENTOR.
Frank C. Chapman
BY
ATTORNEY Patented June 12, 1923.

1,458,393

UNITED STATES PATENT OFFICE.

FRANK C. CHAPMAN, OF MODESTO, CALIFORNIA.

REVOLVING CARRIAGE FOR DRIERS.

Application filed July 18, 1921. Serial No. 485,503.

*To all whom it may concern:*

Be it known that I, FRANK C. CHAPMAN, a citizen of the United States, residing at Modesto, county of Stanislaus, State of California, have invented certain new and useful Improvements in Revolving Carriages for Driers; and I do declare the following to be a full, clear, and exact description of the same, reference being had to the accompanying drawings and to the characters of reference marked thereon, which form a part of this application.

This invention relates to improvements in apparatus for the dehydration of fruit and other produce to be so treated.

The principal object of the invention is to provide a revolvable cylinder in which the produce is placed and which is adapted to be moved from one end of a drying shed to the other.

I have also provided means for allowing the cylinders to hold to and run on tracks extending through the drier and for enabling any number of the cylinders to be coupled up in a continuous line, and moved through the shed in the same manner as a string of cars.

Another object is to arrange means in the cylinders whereby the fruit, etc., therein will be thoroughly agitated and mixed with the revolving of the cylinders, and will also be moved through different levels, thereby insuring that all the fruit will be subjected equally to the influence of the heated air in the shed, which naturally has a tendency to rise, making the top of the shed hotter than near the ground, where the humidity laden air settles.

This latter unavoidable condition explains to a great degree the unsatisfactory drying had in hydrators as commonly built, in which stationary layers of trays are passed through the drying shed, which results in over-drying of the produce in upper trays and the underdrying of that in the lower trays, unless great care is used, and a special method of forcing the air into the shed is employed, as for instance in my co-pending application on dehydrators, filed May 1, 1920, Serial No. 378,158, in order to distribute the heated air over all the fruit as equally as possible.

Another disadvantage of the tray drying method, is that the fruit, etc., remains dormant, and the individual units lying closely one on the other, renders it hard for the hot air to be applied to the entire surface of each such unit. This fact of course makes it necessary to retain the trays longer in the dryer than with the use of my cylindrical carriage, thus decreasing the cost of operation with the latter.

Also, loading and dumping operations may be far more quickly carried out with the cylinders than with the trays, since though the former will hold as much as a stack of trays of approximately the same volume, the cylinder may be dumped as a single unit and at one operation, thereby still further reducing the cost of operating.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a cross section outline of a drying shed, showing a pair of cylinders arranged in transversely spaced relation.

Fig. 2 is an end view of a cylinder, showing half a cover removed.

Fig. 3 is a cross section of a cylinder taken on a line 3—3 of Fig. 1, showing the means used for coupling one cylinder to another.

Fig. 4 is a fragmentary vertical section taken on a line 4—4 of Fig. 2.

Fig. 5 is a top plan view showing a number of the cylinders coupled together.

Referring now more particularly to the characters of reference on the drawings, the numeral 1 denotes the drying shed provided with tracks 2 running from end to end, there being one, two, or as many transverse pairs as may be desired, depending on the capacity of the drier.

My improved produce-conveying carriages comprise wire-mesh drums 3, of suitable length and diameter, and preferably though not necessarily circular, about which are placed a pair of parallel and circular flanged bands 4, adapted to engage a co-operating pair of the tracks 2, so as to maintain the drum in a straight line from one end of the shed to the other.

Between the bands 4 a channel shaped member 5 is placed about the drum, in which rollers 6 are mounted, on which rides a free band 7 having ears or lugs 8 projecting outwardly on a line with its horizontal diametrical plane, whereby to couple the band to those of adjacent drums which are supported on the same pair of tracks.

The ends of the drum are preferably formed and stiffened by circular anglebands 9, which also form seats for removable mesh-covers 10. Transverse end-braces are provided in the form of crossed bars 11, preferably intersecting axially of the drum, and providing means for securing a coverholding bolt 12 thereto.

Extending lengthwise of the drums and preferably at diametrically opposed points are angles 13, while supported by the bracebars 11 are other and axially located angles 14, positioned with their angles facing outwardly and in co-operative relation with the adjacent angle 13. These central angle members are spaced from each other a certain distance, the area included therebetween being enclosed by screening 15 extending lengthwise thereof. In this manner a central enclosure is formed into which the produce being dried cannot enter, and a free air-passage is therefore formed.

Adapted to be supported by co-operating pairs of the angles 11 and 13 are frames 16, extending the full length of the drum, and covered with mesh 17, whereby the drum may be divided into a number of individual compartments.

These partitions however may be removably secured to the angles, so that they may be readily slid out if their use is not desired.

Hand hold covers 18 may be provided for the compartments if desired, which may be made of sufficient size to allow the produce to be inserted and withdrawn therethrough, though I preferably carry out these operations through the ends.

To dump a drum, regardless of whether the removable partitions are carried or not, it is only necessary once a drum is at the discharge end of the shed, to up-end it, when the entire contents will be discharged into a bin or truck at one operation.

It will be evident that when the drums are revolving, especially with the partitions therein, the produce will be continually upset and mixed, falling from one surface to another of their compartments as the revolving of the drums change the level of such surfaces. Also, while at one period in a revolution, the produce in one compartment will be at the bottom of the drum, subjected to the air conditions at that level, with a half revolution of the drum, this same produce is brought to the top of the drum, where it will be subjected to the air conditions at that level, which are bound to be different from those at the bottom. As the position or level of the produce is being constantly shifted from one to the other with the revolving of the drum throughout the length of the shed, it is evident that the produce will be uniformly dried, especially as the produce is constantly tumbling about in the compartments, which are intentionally not filled to their capacity.

The size of the mesh of course will vary with the produce to be dried, prunes for instance permitting the use of a larger mesh than is possible with beans and the like.

Also though wire mesh is specified, and is the most feasible material, freely perforated sheets of any suitable material may be used.

This device will also serve for its purpose without the use of a shed, in localities where the intensity of the sun's heat is sufficient for drying operations to be carried out.

I may also use additional draw or pull bars 19 at the ends of the drums, to run from the center of one to the center of the next one, so as to equalize the draft, the pulling members of the end drums being all connected together by a cross beam or singletree 20.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A drying carriage comprising a drum made of freely perforated material, and a plurality of substantially radial and independent partitions removably mounted therein and extending lengthwise thereof.

2. A drying carriage comprising a drum made of freely perforated material and removable end-covers for the drum, said covers being likewise freely perforated.

3. A drying carriage comprising a drum made of freely perforated material, radial partitions extending lengthwise thereof, and means whereby an axial and longitudinal chamber is formed in which the produce in the carriage cannot enter but to which air has free access.

4. A drying carriage comprising a mesh drum, track engaging means on said drum, a circular channel about the same, a band in said channel adapted for connection to a pulling means, and means between the channel and band whereby to allow free rotation of the drum when the band is pulled.

5. A drying carriage comprising a drum, radial partitions therein, supporting members for said partitions adjacent the periphery of the drum, axially positioned supporting members for said partitions, said last named members being spaced apart, and perforated members connecting the spaced ends of said last named supporting members, whereby to form a central enclosure to which air may have free access but which the produce in the drum cannot enter.

6. A drying carriage comprising a mesh drum, track engaging means on said drum, independent and centrally surrounding means arranged to allow the drum freedom of rotation and longitudinal movement when horizontal pressure is imparted to said means, and bars mounted axially of the drum at the ends thereof and arranged to be connected to like points on an adjacent drum.

7. A device for carrying material to be dried through a dehydrating tunnel comprising a perforated cylinder adapted to be advanced through the tunnel and rotated as it advances, and a series of radial partitions within the cylinder which will carry the material to constantly different positions with the advancement of the cylinder through the tunnel, whereby the same may be uniformly subjected to the heat at different points in such tunnel.

In testimony whereof I affix my signature.

FRANK C. CHAPMAN.